(12) United States Patent
Bouchard et al.

(10) Patent No.: US 8,074,124 B2
(45) Date of Patent: Dec. 6, 2011

(54) VISUALIZATION OF USER INTERACTIONS IN A SYSTEM OF NETWORKED DEVICES

(75) Inventors: Guillaume Bouchard, Crolles (FR); Laurent Donini, Grenoble (FR); Pascal Valobra, Meylan (FR); Victor Ciriza, La Tour du Pin (FR)

(73) Assignee: Xerox Corporation, Norwalk, CT (US)

(*) Notice: Subject to any disclaimer, the term of this patent is extended or adjusted under 35 U.S.C. 154(b) by 274 days.

(21) Appl. No.: 12/201,093

(22) Filed: Aug. 29, 2008

(65) Prior Publication Data

US 2010/0058121 A1    Mar. 4, 2010

(51) Int. Cl.
*G06F 11/00* (2006.01)

(52) U.S. Cl. .......... 714/57; 714/25; 714/47.1; 714/47.2; 714/47.3; 714/48; 358/1.14

(58) Field of Classification Search .............. 714/25, 714/47, 48, 57, 47.1, 47.2, 47.3; 358/1.14
See application file for complete search history.

(56) References Cited

U.S. PATENT DOCUMENTS

| | | | |
|---|---|---|---|
| 4,586,147 A * | 4/1986 | Tadokoro | 702/184 |
| 5,049,873 A | 9/1991 | Robins et al. | |
| 5,590,271 A | 12/1996 | Klinker | |
| 5,822,532 A | 10/1998 | Ikeda | |
| 5,935,262 A * | 8/1999 | Barrett et al. | 714/46 |
| 7,406,271 B2 * | 7/2008 | Robinson | 399/9 |
| 7,623,256 B2 * | 11/2009 | Ciriza et al. | 358/1.15 |
| 2002/0073355 A1 * | 6/2002 | Cerami et al. | 714/4 |
| 2003/0107575 A1 | 6/2003 | Cardno | |
| 2003/0110412 A1 * | 6/2003 | Neville | 714/25 |
| 2004/0181712 A1 * | 9/2004 | Taniguchi et al. | 714/47 |
| 2005/0192825 A1 | 9/2005 | Cardno et al. | |
| 2006/0269297 A1 * | 11/2006 | Robinson | 399/9 |
| 2007/0097883 A1 | 5/2007 | Liu et al. | |
| 2007/0236502 A1 | 10/2007 | Huang et al. | |
| 2007/0268509 A1 | 11/2007 | Andreoli et al. | |
| 2008/0037432 A1 | 2/2008 | Cohen et al. | |
| 2008/0038007 A1 * | 2/2008 | Yamazaki | 399/75 |
| 2008/0246987 A1 * | 10/2008 | Scrafford et al. | 358/1.15 |

FOREIGN PATENT DOCUMENTS

| | | |
|---|---|---|
| EP | 1130510 | 9/2001 |
| EP | 1577795 | 9/2005 |
| JP | 5075628 | 3/1993 |
| WO | WO9610782 | 4/1996 |

OTHER PUBLICATIONS

European Search Report for European Patent Application No. 09168125.4 mailed Jan. 27, 2010.

* cited by examiner

*Primary Examiner* — Charles Ehne
(74) *Attorney, Agent, or Firm* — Fay Sharpe LLP

(57) ABSTRACT

As set forth herein, a system identifies soft failures of devices. An interface captures transactional data between one or more users and one or more devices within the system. A data log receives the transactional data from the interface and stores the data as historical data for subsequent retrieval. A warning system evaluates the historical data in the data log to identify one or more devices that have a soft failure condition, wherein an alarm is output for each soft failure identified. A display module combines the historical data from the data log and one or more alarms from the warning system into a single display for review.

18 Claims, 10 Drawing Sheets

XEROX DEVICE MANAGER -- WEBPAGE DIALOG

SWITCHES SUMMARY

| DESTINATION PRINTER | RATIO |
|---|---|
| ⇧ PRINTER-3 | 76% |
| ⇧ PRINTER-1 | 20% |
| ⇧ PRINTER-9 | 04% |

LAST RECEIVED JOBS

| USER NAME | JOB DATE | |
|---|---|---|
| USER-1 | 04/10/2007 | 14:33:28 |
| USER-2 | 04/10/2007 | 14:34:51 |
| USER-2 | 04/10/2007 | 14:35:42 |

SWITCHES FOR THE FAILURE

| USER NAME | SWITCH DATE | | DESTINATION PRINTER |
|---|---|---|---|
| USER-0 | 04/10/2007 | 14:38:13 | PRINTER-1 |
| USER-0 | 04/10/2007 | 14:39:01 | PRINTER-1 |
| USER-0 | 04/10/2007 | 14:39:42 | PRINTER-1 |
| USER-0 | 04/10/2007 | 14:40:12 | PRINTER-1 |
| USER-0 | 04/10/2007 | 14:41:21 | PRINTER-1 |
| USER-2 | 04/10/2007 | 15:09:51 | PRINTER-3 |
| USER-4 | 04/10/2007 | 15:12:10 | PRINTER-3 |
| USER-4 | 04/10/2007 | 15:13:48 | PRINTER-3 |

FIG. 6

| SWITCHES SUMMARY | | |
|---|---|---|
| | DESTINATION PRINTER | RATIO |
| ⇧ | PRINTER-1 | 100% |

730

| LAST RECEIVED JOBS | | |
|---|---|---|
| | USER NAME | JOB DATE |
| 🗐 | USER-0 | 28/09/2007 12:31:20 |
| 🗐 | USER-1 | 28/09/2007 12:49:23 |

720

| SWITCHES FOR THE FAILURE | | | |
|---|---|---|---|
| | USER NAME | SWITCH DATE | DESTINATION PRINTER |
| ✖ | USER-0 | 28/09/2007 12:56:05 | PRINTER-1 |
| ✖ | USER-2 | 28/09/2007 13:06:48 | PRINTER-1 |

VISUALIZATION OF USER INTERACTIONS IN A SYSTEM OF NETWORKED DEVICES

BACKGROUND

The present exemplary embodiments relate to device monitoring. They find particular application in conjunction with failure detection of devices in a network. In one embodiment, usage characteristics of network devices are monitored and presented visually to determine if a soft failure has occurred. However, it is to be appreciated that the present exemplary embodiments are also amenable to other like applications.

Devices employed in today's world provide a plurality of specific functionalities to process data in a variety of disparate forms. Such devices can be employed in a system, such as an office environment. For example, a printing device can allow electronically stored data to be printed as a hard copy. In another example, a scanning device can convert hard copy data into a digital format. Since most devices have a specialized use, several different device types may be employed to accommodate various user requirements. Alternatively or in addition, several of the same device types can accommodate a large number of the same data processing requirements.

Networks provide interconnectivity between devices and allow users to access diverse resources connected to the system. For logistical reasons, particular devices can be located proximate to one or more users that employ such devices on a regular basis. Generally, one device type can satisfy the data processing requirements of a number of different users. In one example, a printer is located in a corner of an office plan and is utilized regularly by a portion of office staff stationed in the same area. By providing users with data processing proximate to their respective work areas, a system can operate with greater efficiency.

Failure can be defined as any event that disables or diminishes the functionality of a device. It is not cost effective, however, to monitor and capture every possible deleterious condition associated with each device. Accordingly, a dichotomy exists between events that cause a message output from a device and those that do not. Such events are defined as hard failures and soft failures respectively.

Generally, hard failures cause a device to output a message to indicate that a predefined event has occurred. A hard failure message can be sent to a local device interface and/or via the network to inform personnel that a particular deleterious event has occurred. Examples of hard failures for a printing device include a paper jam, a toner condition, and a mechanical breakdown. Events that are not defined as hard failures are considered soft failures. In one example, a soft failure includes hard copies created with blurred text, ink lines, and/or character misalignment. Since a message is not output when a soft failure occurs, a deleterious condition can go undetected for an unnecessary period of time.

In order to detect soft failures within a system, usage characteristics have been analyzed to determine if a secondary device is used in place of a commonly used primary device. Generally, a switch from a primary device to a secondary device has been employed to identify primary device failure wherein a secondary device is employed as a substitute. Such an inference, however, is tenuous in view of the vast amount data generated from device and user interaction logs. Moreover, even if a switch is identified, the motivation for the change may be unrelated to soft failure. For example, a user may vary device use based on permanent usage changes (e.g., moving to another office) or because of temporary unusual usage needs (e.g., other personnel require use of the same primary devices). Thus, device switching alone does not provide enough information to accurately infer that a soft failure condition exists.

Accordingly, there is a need for systems and methods for the accurate detection and presentation of soft device failure within a system.

BRIEF DESCRIPTION

In one aspect, a system identifies soft failures of devices. An interface captures transactional data between one or more users and one or more devices within the system. A data log receives the transactional data from the interface and stores the data as historical data for subsequent retrieval. A warning system evaluates the historical data in the data log to identify one or more devices that have a soft failure condition, wherein an alarm is output for each soft failure identified. A display module combines the historical data from the data log and one or more alarms from the warning system into a single display for review.

In another aspect, a system identifies soft device failure candidates and includes one or more users and a plurality of devices that are coupled to the one or more users, which receive and process data. A log stores the historical use of the plurality of devices by the one or more users. A primary device is one of the plurality of devices and is employed by the one or more users when all of the plurality of devices are available. A warning system reviews the use of the one or more users, wherein an alarm is output when the primary device is not utilized according to a predetermined threshold. A display module combines the historical data from the log and one or more alarms from the warning system into a single display.

In yet another aspect, a method is utilized that identifies soft device failures within a system. Use of a device is reviewed in the system over a period of time and a list of users that have the device as a primary device is computed. System logs are reviewed to identify entries that include the device and the user. Usage logs are displayed in a chronological order and a determination is made as to whether the device has a soft failure condition.

BRIEF DESCRIPTION OF THE DRAWINGS

FIG. 6 illustrates an exemplary display of device volume use data alongside alarm data, in accordance with an aspect of the subject invention.

FIG. 7 illustrates an exemplary display of device volume use data alongside alarm data, in accordance with an aspect of the subject invention.

DETAILED DESCRIPTION

In describing the various embodiments of the lighting system, like elements of each embodiment are described through the use of the same or similar reference numbers.

Figure 1:
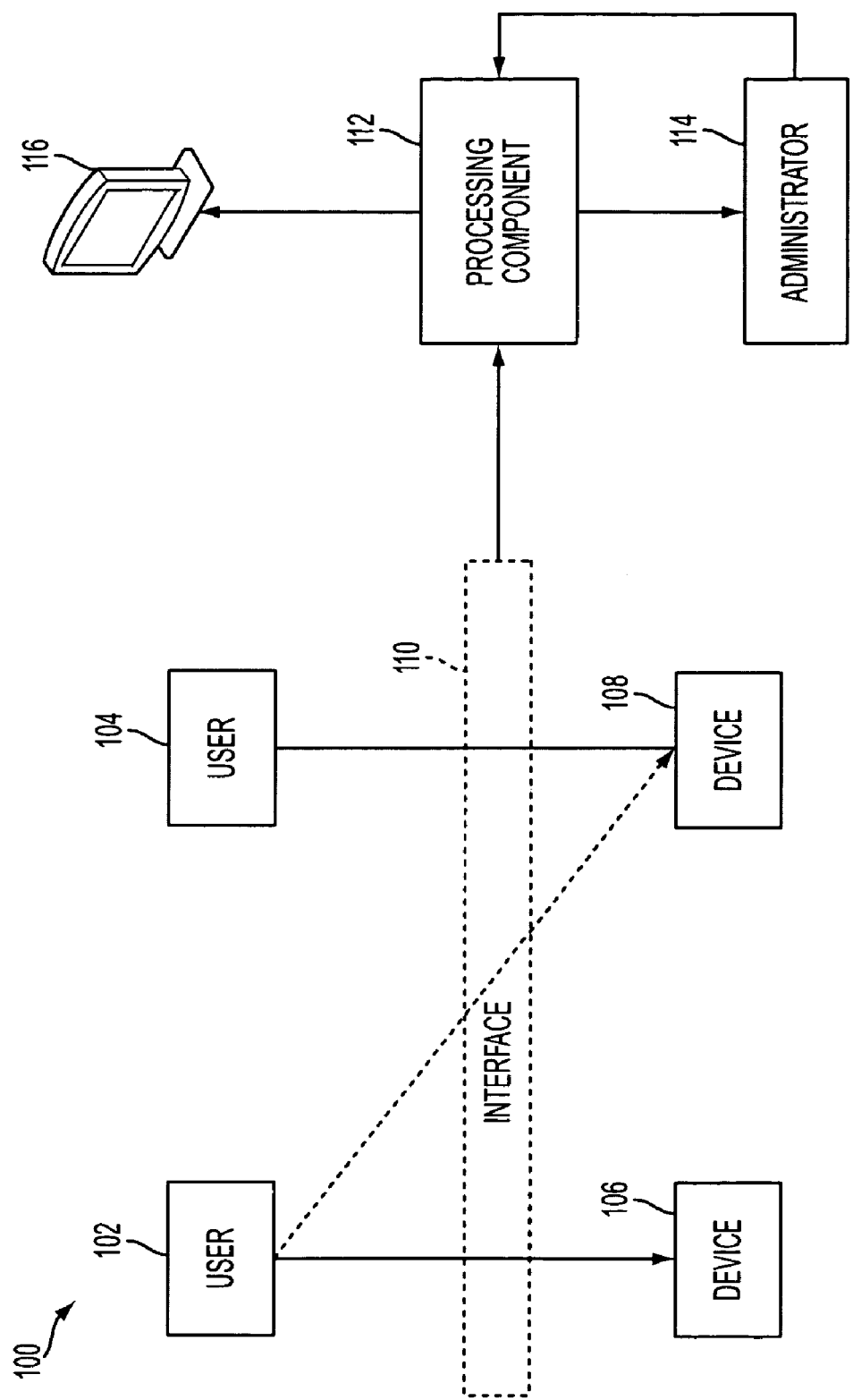
FIG. 1 illustrates a system that detects and presents soft failures within a system, in accordance with an aspect of the subject invention.

FIG. 1 illustrates a system 100 that detects and presents soft failures of devices. A user 102 and a user 104 communicate with a device 106 and a device 108 respectively. An interface 110 is placed in between the users 102, 104 and the devices 106, 108 to capture transactions occurring therebetween. The interface 110 transmits the transactional information to a processing component 112. An administrator 114 reviews the usage data from the processing component 112 and provides input that is sent to a display 116. The display can provide information related to soft failure of the devices 106 and/or 108. In one embodiment, the system 100 is a print system.

The system 100 can employ wired and/or wireless technologies to couple the devices 106, 108 to the users 102 and 104 and/or to each other. Hubs, routers or other hardware (not shown) can be utilized to facilitate connection points for the devices and/or the users. In this manner, the users 102, 104 can connect to any of the devices within the system 100. It is to be appreciated that the devices 106, 108 included in the system 100 are for representative purposes only and that any number and type of device can be employed in association with the system 100. For instance, the system 100 can include printers, facsimile machines, multifunction devices, plotters, scanners, multimedia displays, projectors, etc. that accept and process data.

Primary devices are indicated by connection to the respective users 102, 104 via a solid line. A primary device is defined as one that is chosen by the user 102, 104 if every device in the system 100 is working properly. One primary device can be selected for each device capability constraint. For example, the user 102 utilizes the device 106 as a primary device since it offers a particular data processing capability (e.g., printing in color). A primary device can generally be selected by the user 102, 104 based on a combination of data processing requirements and convenience. For instance, the user 102 may select the device 106 because it is the closest printer to his/her workspace that provides color printing.

Regardless of a user's motivation, device use can be monitored via the interface 110 to determine devices that are primary devices for each user 102, 104. The interface 110 can be a processor, a computer, a server, etc. that receives transactional information between the users 102, 104 and the devices 106, 108. The processing component 112 receives use data from the interface 110 to monitor all interaction between each user and the devices within the system 100.

The interface 110 can capture various data including a user ID, a device ID, a category of interaction (e.g., print, scan-to-mail, and copy), an interaction date, a duration, a device location, etc. This data can be reviewed and correlated to other use data to provide different standards that define various parameters, such as a primary device. In one example, exclusive use of a device by a user for a length of time greater than a predetermined threshold will define a device as a primary device.

A switch can occur by a user from a primary device to any non-primary device, which are referred to herein as redirection candidates. A switch from a primary device to a redirection candidate is defined by the date of interaction between a user and a device that is different from her/his primary device. Redirection devices are depicted between a user and a device via a dashed line. As illustrated, the user 102 employs the device 106 as a primary device within the system 100. If for some reason the user 102 is dissatisfied with the performance of the device 106, he/she may decide to use another device within the system that provides the same data processing.

In one example, the user 102 switches from the device 106 to the device 108 at a given point in time for a particular duration. Reviewing interaction data with additional metrics can verify if the switch was related to device performance or some other reason such as relocation of the user, temporary usage requirements, device use volume, etc. In addition, the move from a primary device to a redirect device can be filtered such that switching activity is reviewed only when a hard failure (e.g., error messaging sent the device) does not occur. In this manner, soft failures can be more accurately identified.

The processing component 112 evaluates data from the interface to identify possible soft device failures within the system 100. The processing component receives information from the interface 110 related to user-device interaction and utilizes such data to identify events that can qualify as a soft failure. In one aspect, the processing component 112 can include a memory (not shown) to store historical data that can be analyzed to identify events relevant to device failure.

In this regard, the processing component 112 can utilize an algorithm or other strategy to review switching events and to categorize them as potential soft failures. Moreover, the processing component 112 can include a filter (not shown) that eliminates events that are likely not caused by soft failure since a device switch can occur for reasons unrelated to device failure. In this manner, the processing component 112 can analyze and present only relevant data. This system information can be stored and retrieved from the memory (not shown).

The administrator 114 can receive data from the processing component 112 that identifies one or more devices that may have a soft failure condition within the system 100. The administrator 114 is generally aware of system information that may not be received by the processing component 112 and thus incorrectly classifies a soft failure condition when in fact there is none. In one example, events such as volume of use for a device, changes in employment, logistics, employee tasks, system workload, employee roles, etc. can be considered in determining whether a soft failure has occurred. For instance, the user 102 switch away from the device 106 can be due to a third party (not shown) that has a temporary need for the device 106 that will affect the user 102 usage. As a result, the user 102 switches to the device 108 to free the device 106 for the third party. Since the processing device may only have the use data to analyze, review by the administrator 114 can help to present only data related to soft failure. In this manner, the administrator 114 can make informed decisions related to device conditions within the system 100.

In addition, the administrator 114 can serve a gatekeeper role in allowing only relevant data to be transmitted from the processing component 112 to the display 116. The display 116 can present device status data to one or more users (102, 104, etc.) and/or the administrator 114. In one aspect, the display 116 graphically presents device use data. For example, the display 116 can present the devices and users in any number of colors, shapes, line types, graphics, titles, pictures, graphs, etc. In one example, users are yellow circles and primary devices are blue squares connected to the user via a solid line. If a redirection event occurs, the device can switch to red and connect via a dashed line to the user to indicate a possible soft failure.

Possible soft failure identified by the processing component can be presented as a level of trustworthiness that can vary based on the algorithm utilized by the processing component 112 and/or the amount of data received by the processing component for a given period of time. The trustworthiness of the soft failure data can be presented in any appropriate form that allows a user to interpret such information quickly. In one example, a bar graph or line graph is employed wherein an X-axis relates to time and a Y-axis relates to a percentage (e.g., from 0 to 100) of trustworthiness of soft failure identification.

Graphical device switching can be presented alongside device usage volume to aid in identification of true soft failures within the system 100. The usage volume can be presented in any suitable manner to allow easy interpretation by a viewer. In one aspect, the soft failure identification data and use volume can be presented side-by-side (top and bottom) with the same time axis. A viewer can then quickly review this data and determine times throughout a given period that a soft failure is identified and compare this with volume data.

The volume data can be helpful to identify a true soft failure vs. a false soft failure. For example, if a given device has a large use volume for a period of time that suddenly drops off, this can indicate a true soft failure. On the contrary, minimal device use for a given period of time followed by no use can indicate a false soft failure. The inference is that the given device was not a primary device for any user within the system 100 and thus, had low volume of use. This coupling of data presentation can be incredibly helpful to the administrator 114 to sift through data for systems with a large number of devices and/or users, and identify and remedy soft failures therein. Greater system efficiency and throughput can be realized as a result.

The display 116 is for exemplary purposes only and can represent a plurality of displays (not shown) that are located in a several of disparate locations throughout the system 100. The display 116 can be substantially any device that can present data that is electronically received from the processing component 112. For example, the display 116 can be an LCD, plasma, CRT, etc. monitor that presents data electronically. Alternatively or in addition, the display 116 can present received data in a hard copy format such as a printer, facsimile, plotter etc. The display can present data in any color and can receive data from the processing component 112 via any wireless or hard wire protocol and/or standard.

The processing component 112 illustrates one possible hardware configuration to support the systems and methods described herein. It is to be appreciated that although a standalone architecture is illustrated, that any suitable computing environment can be employed in accordance with the present embodiments. For example, computing architectures including, but not limited to, stand alone, multiprocessor, distributed, client/server, minicomputer, mainframe, supercomputer, digital and analog can be employed in accordance with the present embodiment.

The processing component can employ an exemplary environment such as a computer that includes a processing unit (not shown), a system memory (not shown), and a system bus (not shown) that couples various system components including the system memory to the processing unit. The processing unit can be any of various commercially available processors. Dual microprocessors and other multi-processor architectures also can be used as the processing unit.

The system bus can be any of several types of bus structure including a memory bus or memory controller, a peripheral bus, and a local bus using any of a variety of commercially available bus architectures. The computer memory includes read only memory (ROM) and random access memory (RAM). A basic input/output system (BIOS), containing the basic routines that help to transfer information between elements within the computer, such as during start-up, is stored in ROM.

The computer can further include a hard disk drive, a magnetic disk drive, e.g., to read from or write to a removable disk, and an optical disk drive, e.g., for reading a CD-ROM disk or to read from or write to other optical media. The computer typically includes at least some form of computer readable media. Computer readable media can be any available media that can be accessed by the computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by the computer.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

A number of program modules may be stored in the drives and RAM, including an operating system, one or more application programs, other program modules, and program non-interrupt data. The operating system in the computer can be any of a number of commercially available operating systems.

A user may enter commands and information into the computer through a keyboard (not shown) and a pointing device (not shown), such as a mouse. Other input devices (not shown) may include a microphone, an IR remote control, a joystick, a game pad, a satellite dish, a scanner, or the like. These and other input devices are often connected to the processing unit through a serial port interface (not shown) that is coupled to the system bus, but may be connected by other interfaces, such as a parallel port, a game port, a universal serial bus ("USB"), an IR interface, etc. A monitor (e.g., the display 116), or other type of display device, is also connected to the system bus via an interface, such as a video adapter (not shown). In addition to the monitor, a computer typically includes other peripheral output devices (not shown), such as speakers, printers etc.

The computer can operate in a networked environment using logical and/or physical connections to one or more remote computers, such as a remote computer(s). The remote computer(s) can be a workstation, a server computer, a router, a personal computer, microprocessor based entertainment appliance, a peer device or other common network node, and typically includes many or all of the elements described relative to the computer. The logical connections depicted include a local area network (LAN) and a wide area network (WAN). Such networking environments are commonplace in offices, enterprise-wide computer networks, intranets and the Internet.

When used in a LAN networking environment, the computer is connected to the local network through a network interface or adapter. When used in a WAN networking environment, the computer typically includes a modem, or is connected to a communications server on the LAN, or has other means for establishing communications over the WAN, such as the Internet. In a networked environment, program modules depicted relative to the computer, or portions thereof, may be stored in the remote memory storage device. It will be appreciated that network connections described herein are exemplary and other means of establishing a communications link between the computers may be used.

Figure 2:
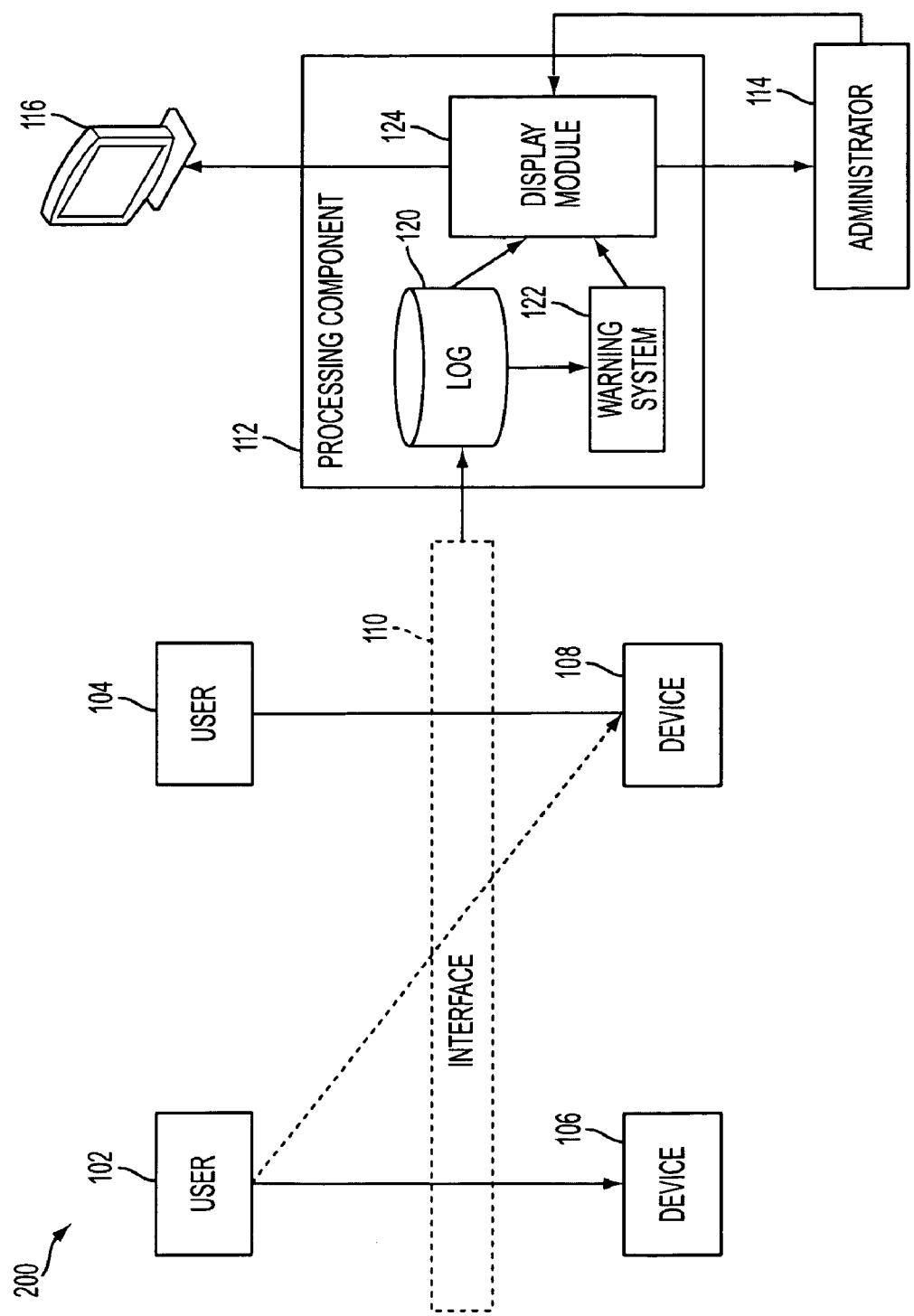
FIG. 2 illustrates a system that detects and presents soft failures within a system, in accordance with an aspect of the subject invention.

Referring now to FIG. 2, which illustrates a system 200 wherein the processing component 112 includes a log 120, a warning system 122, and a display module 124. The log 120 can store transactional information from the interface 110 for subsequent retrieval. The warning system 122 can receive data from the log 120 and provide an output to the display module 124. This output can indicate that a soft failure condition exists within the system 200. The display module 124 receives data from both the log 120 and the warning system 122 to verify that the warning system 122 output is appropriate. This information is conveyed to the administrator 114 for review.

The display module 124 can be employed only to output information to the display 116 based on a time, an event or periodically. One event that can trigger data output is the identification by the administrator 114 that a device has suffered a soft failure. This trigger can be input to the display module 124 by the warning system 122. In this case, the warning system 122 can generate an output automatically if a particular set of predetermined criteria is met. In one example, a threshold value of the number of switches away from a particular device within a given time period can trigger such an output. In another example, the non-use of a device for longer than a predetermined time period can trigger an output.

In one embodiment, the administrator 114 interacts with the display module 124 to determine whether a soft failure warning is sent to the display 116. In this manner, the administrator 114 can review alleged soft failures in context (e.g., historical device usage stored in the log 120) and make an informed decision as whether the warning system 122 was correct in its assessment. This information can be presented to the administrator 114 side-by-side within a graph to facilitate efficient data analysis.

The log 120 can be substantially any storage device that receives usage data from the interface 110 on a periodic basis, based on an event or continuously. The data can be organized and stored in files or other data structures that can be easily retrieved by the warning system 122 and/or display module 124. The user-device interactions stored on the log 120 can also be organized based on time constraints and/or specific to one or more devices.

The warning system 122 employs a preconfigured algorithm or logic process to analyze system 200 device usage and to identify soft failures contained therein. Soft failures can be identified, as mentioned above, based on user redirection away from primary devices when no hard failure is indicated. In order for a redirection to be identified, however, a device is first identified as a primary device for a user over a given period of time. Also, one or more redirection candidates that have the same/similar data processing capabilities are identified. Subsequently, a redirection can be indicative of a soft failure since the primary device is no longer in use by one or more users.

In most cases, however, this analysis is conducted without additional outside knowledge such as personnel changes, personnel assignments, logistical concerns, etc. Some examples can include permanent usage changes (e.g., a user moving to another office) or to temporary unusual usage needs (e.g., communications\marketing team requiring unusual amount of color printing due to a press event). As such, the information to conduct this analysis is incomplete and may lead to erroneous soft failure identification.

The display module 124 can be triggered by the warning system 122 and/or the administrator 114. In one embodiment, the display module 124 takes as input a device index and a time range that are specified by the administrator 114. It is assumed that a target device d, a time range [t1, t2] and historical action data until date t2 are provided and recorded via the log 120. In one embodiment, the display module 124 can compute a primary device during [t1, t2] for a particular user. It is assumed that each user has only one primary device during the time period. A list of users Lu(d) that have device d as primary device during [t1,t2] is computed. A list Ld(d) of redirection devices from Lu(d), (i.e. devices that are likely to be used by users in Lu(d) if the device d is unavailable or not working properly during the period [t1,t2]) is computed. The display module 124 then finds all the historical data stored in the log 120 such that the timestamp belongs to the range [t1,t2], the user is in the list Lu(d) and the device is in the list Ld(d).

Once identified, the historical data is provided to the administrator 114 with at least four of the following statements: whether the primary device of the user is d and the user does not print on d (device switch), the date of the job, the user id generating the log, the primary device of the user (computed in step 1), the selected device (mentioned in the log), additional information about the job, and whether the primary device of the user is d and the user print on d (normal behavior). In this manner, the device switches are displayed to the administrator 114. In another embodiment, one may also display messages coming from a particular device d in addition to historical use data, since they can contain information about possible failures.

Figure 3:
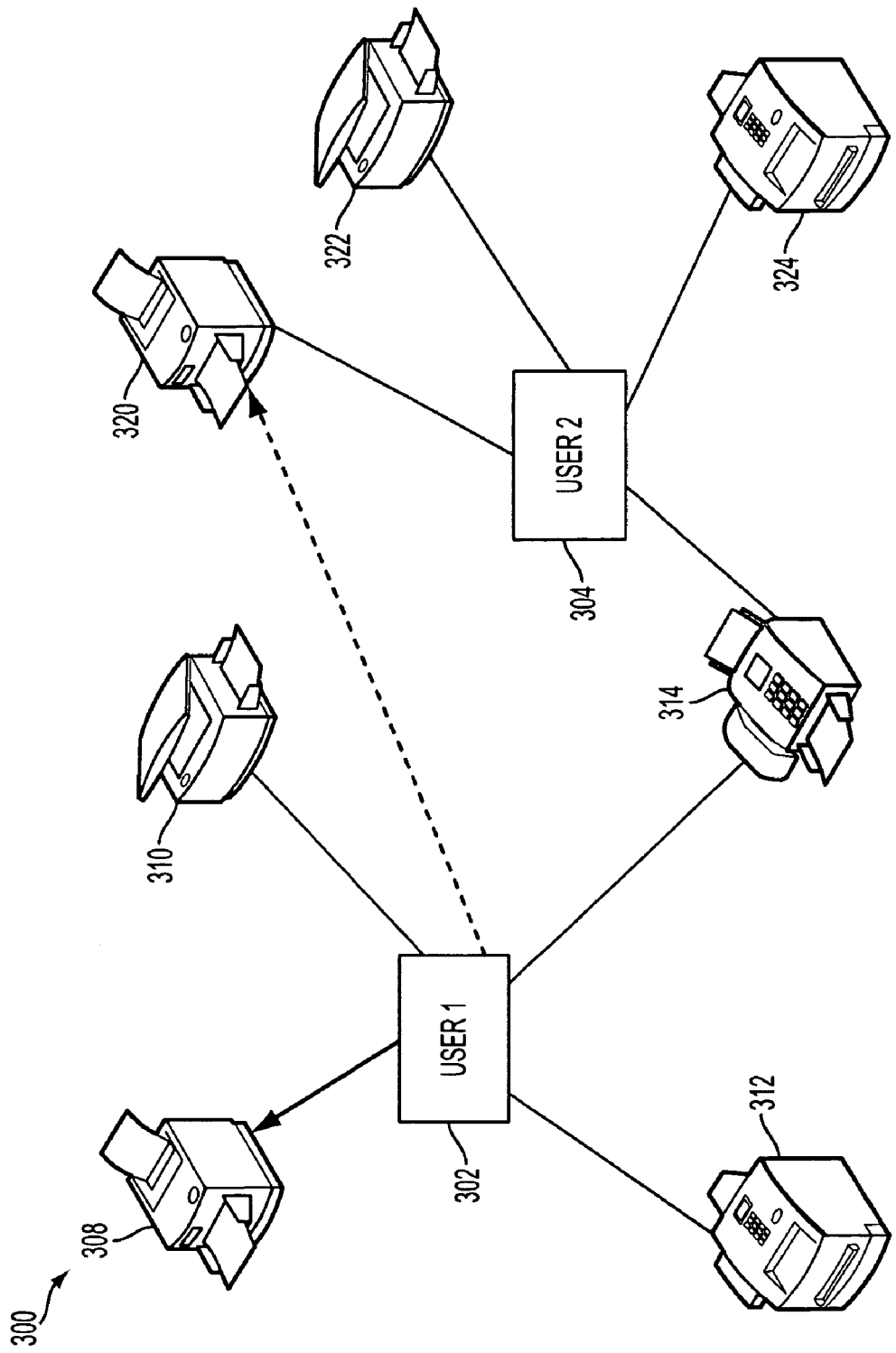
FIG. 3 illustrates an exemplary screen shot of a system that shows a switch from a primary device to a redirect device, in accordance with an aspect of the subject invention.
Figure 4:
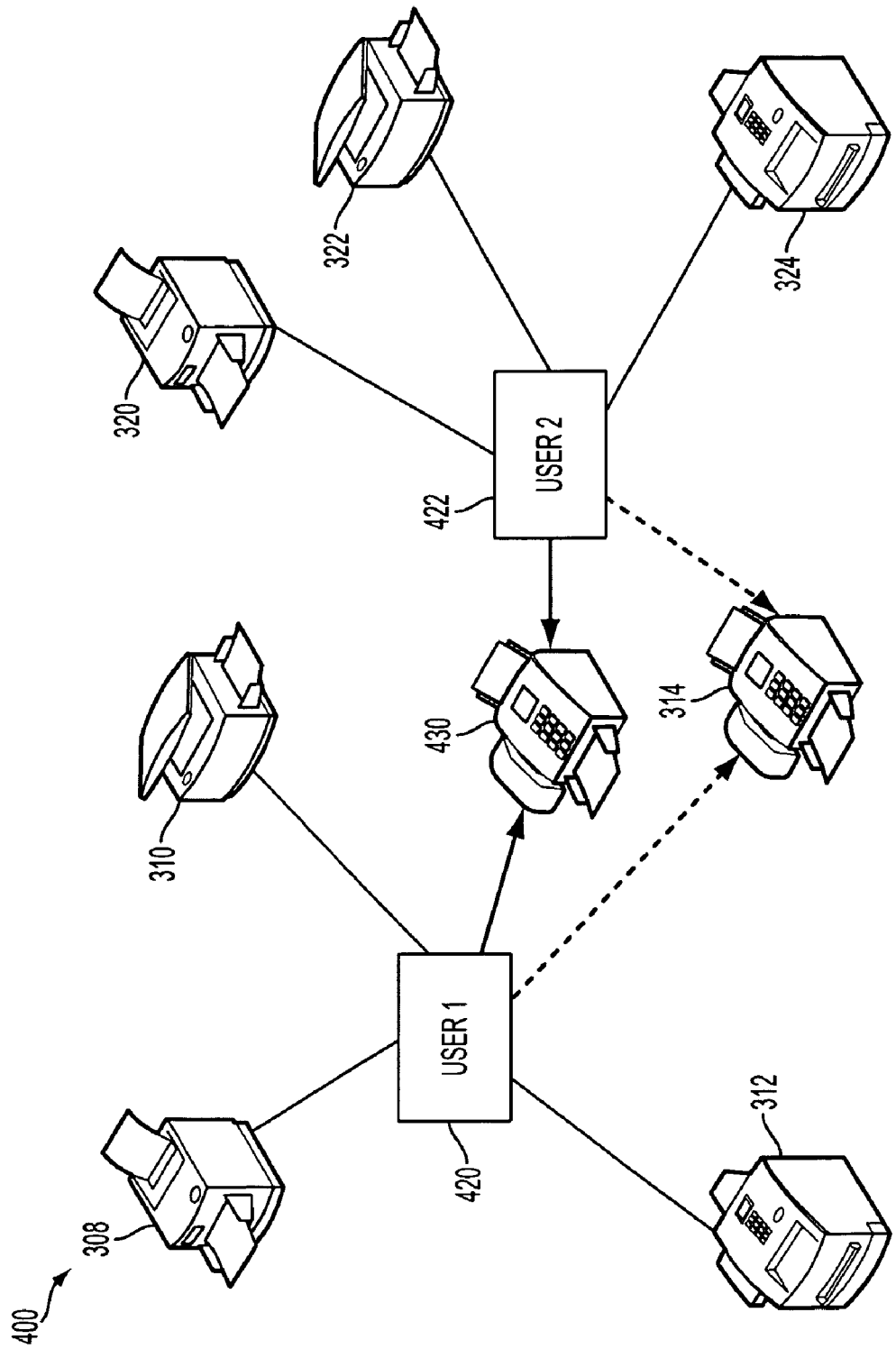
FIG. 4 illustrates an exemplary screen shot of a system that shows a switch from a primary device to a redirect device, in accordance with an aspect of the subject invention.
Figure 5:
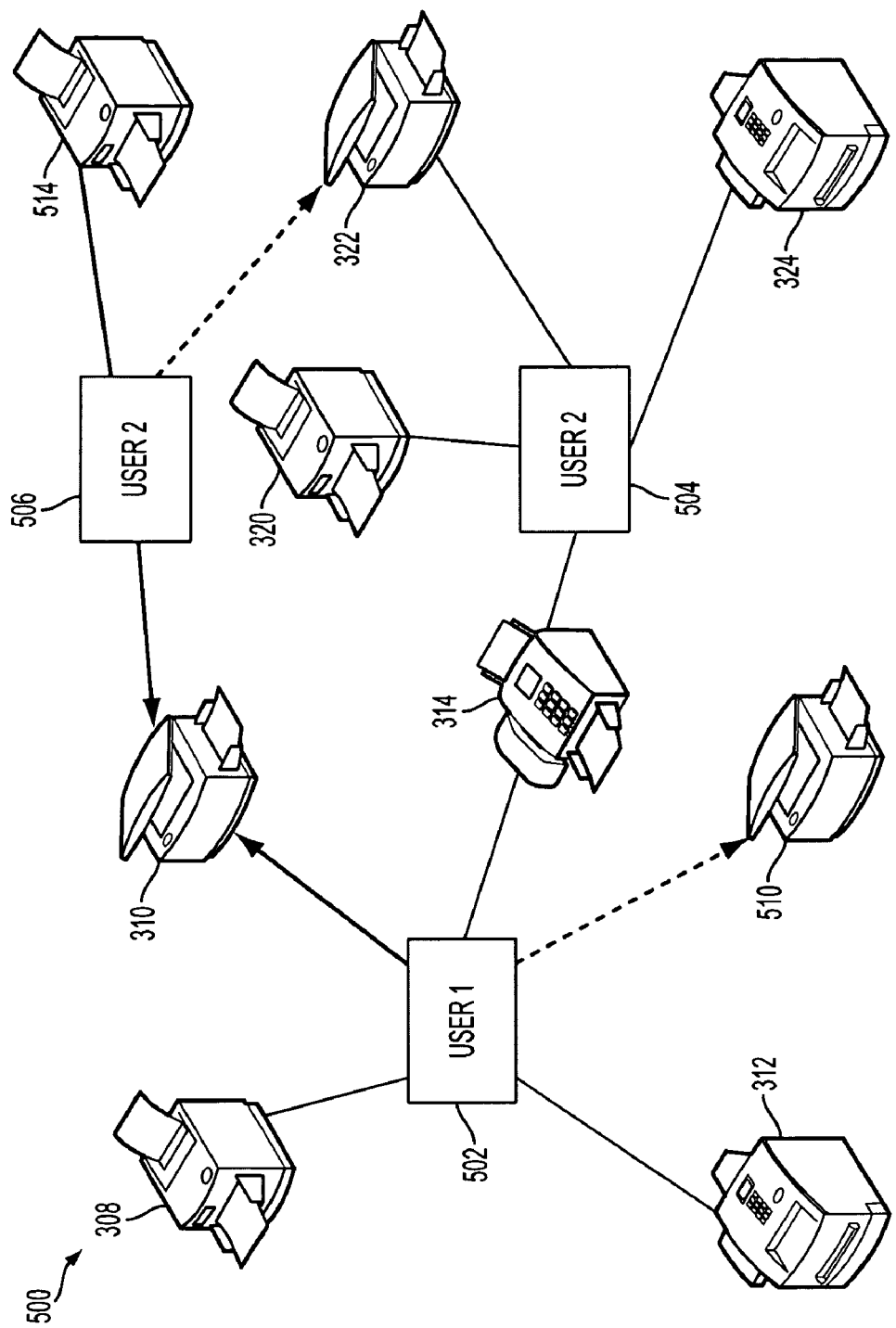
FIG. 5 illustrates an exemplary screen shot of a system that shows a switch from a primary device to a redirect device, in accordance with an aspect of the subject invention.

FIGS. 3-5 illustrate exemplary screen shots of a system 300, a system 400 and a system 500 respectively that can be presented to the administrator 114 or the users 102, 104. Alternatively or in addition, the systems 300, 400, and 500 can illustrate actual conditions as they relate to device functionality and user interaction within each system.

Referring now to FIG. 3, a user 302 and a user 304 interface with a plurality of devices within the system 300. The user 302 is coupled to a printer 308, a copier 310, a multi-function device 312 and a fax machine 314 as designated by lines connecting thereto. The user 104 is coupled to a printer 320, a copier 322, and a multifunction device 324 and further is connected to the fax machine 314 in common with the user 102. In one instance, the system 300 can be a network within an office environment.

The system 300 can employ wired and/or wireless technologies to couple each of the devices 308, 310, 312, 314, 320, 322, and 324 to each other (not shown) and/or to the users 302 and 304. Hubs, routers or other hardware (not shown) can be utilized to facilitate connection points for the devices and/or the users. In this manner, the users 302, 304 can connect to any of the devices within the system 300. It is to be appreciated that the devices 308-324 included in the system 300 are for representative purposes only and that any number and type of device can be employed. For instance, the system 300 can include plotters, scanners, multimedia displays, projectors, etc. that accept and process data.

Primary devices are indicated by connection to the respective users 302, 304 via a solid line. A primary device is defined as one that is chosen by the user 302, 304 if every device in the system 300 is working properly. One primary device can be selected for each device capability constraint. For example, the user 302 utilizes the printer 308, the copier 310, the multifunction device 312, and the fax machine 314 each as a primary device since they offer disparate data processing capabilities. A primary device can generally be selected by the user 302, 304 based on a combination of data processing requirements and convenience. For instance, the user 302 may select the printer 308 because it is the closest printer to his workspace that provides desired data processing requirements.

Regardless of a user's motivation, device use can be monitored to determine which devices are primary devices for each user in the system 300. Generally, a log (e.g., log 120) is employed to monitor all interaction between each user and the devices within the system 300. In one example, exclusive use of a device by a user for a length of time greater than a predetermined threshold will define a device as a primary device. Presentation of the device interaction via solid or dashed lines presents usage data in a user-friendly context. Thus, upon review of the display, a user (e.g., the administrator 114) can immediately identify device switching.

A switch can occur, defined as a date of interaction between a user and a device, that is different from her/his primary device, and is referred to herein as a redirection device. Redirection devices are designated via a dashed line. As illustrated, the user 302 employs the printer 308 as a primary device within the system 300. If for some reason the user 302 is dissatisfied with the performance of the printer 308, he/she may decide to use another device within the system that provides the same data processing. In one example, the user 302 switches from the printer 308 to the printer 320 at a given point in time for a particular duration. Although, the reason for the switch is unknown, reviewing the interaction data with other metrics can help to verify if the move was related to device performance or some other reason such as relocation of the user, temporary usage requirements, etc. In addition, the move from a primary device to a redirection device can be filtered such that switching activity is reviewed only when a hard failure (e.g., error messaging sent the device) does not occur. In this manner, soft failures can be more accurately identified.

In another example, FIG. 4 illustrates a system 400 that includes a user 420 and a user 422 which are coupled to the printer 108, the copier 110, the multi-function device 112, the fax machine 114, the printer 120, the copier 122, and the multifunction device 124 from the system 300. In addition, the system 400 includes a fax machine 430 that is employed as a primary device by both the users 420 and 422. At some point in time, the users 420 and 422 discontinue use of the fax machine 314 and instead both switch to the fax machine 430 with substantially the same data processing capabilities as the fax 314. Accordingly, the fax machine 430 is viewed as a redirection device. In one aspect, the fax 314 does not output an error message to indicate a hard failure has occurred.

In yet another example, FIG. 5 illustrates a system 500 that includes the printer 308, the copier 310, the multi-function device 312, the fax machine 314, the printer 320, the copier 322, the multifunction device 324, a copier 510, and a printer 514. A user 502 interfaces with the printer 308, the copier 310, the multi-function device 312, and the fax machine 314 as primary devices. A user 504 interfaces with the fax machine 314, the printer 320, the copier 322, and the multifunction device 324 as primary devices. A user 506 interfaces with the copier 310 and the printer 514 as primary devices. The user 502 utilizes the copier 310 in common with the user 506 and, at some point in time, both the users 502 and 506 switch away from the copier 310. The user 506 switches to the copier 322 and the user 502 switches to the copier 510, as their redirection devices respectfully.

In one example, the soft failure detections systems depicted herein are employed with print systems wherein all the devices within the system are printers. The interaction is an input-output system where the input is an electronic document submitted by the user and the output is a printed document. The possible timestamps correspond to the jobs submission date, job start or job completion. The optional information that can be present in the logs can be the number of pages, the color mode, the print quality mode, the duplex mode, the ink coverage, etc.

Information contained in system logs can be useful for several applications, such as print redirection discovery, user profiling, automatic build of the virtual map of the system usage, and soft failure detection. During attempts to design an optimal incident notification or warning system for print systems, it has been noticed that the number of false alarms is generally higher for printers that are rarely used compared to printers having many users. In this case false alarms are generated on printers that do not have a usage history that fits the generative statistical modeling approach in the core of the algorithm.

One can understand this reliability issues intuitively by assimilating users to failure sensors. In large devices as MFDs, the high amount of users allows the generative techniques learn from a wide panel of user behaviors and build a solid statistical model. In small devices with a small amount of users (e.g., less than 5) the change in the behavior of one user can induce the system to infer a state change not always due to a failure in the device. The amount of data also plays an important role as with any statistical learning based system since smaller devices have smaller usage history and smaller sets to learn from.

A naive approach is to consider only the logs related to a device d. However, this would not give information about users that have used another device d' due to a possible failure or unavailability of the target device d. Alternatively, one can display all the logs between dates t1 and t2. However, for medium or large systems, the number of logs can be too large to be quickly analyzed by a human. Accordingly, a trade-off is desired wherein a method is utilized that automatically filters out the logs of users that are not impacted by failures on the target device d. In addition, relevant information is displayed to facilitate the identification of problems in the usage of a system.

In one example, usage of printing devices within a system is monitored, where a failure is detected by the warning system 122 (the soft failure detection system in this case). The device usage and failure detection can be presented in a display as shown in FIGS. 6 and 7 as displays 600 and 700. The display 600 includes large volume device use, and includes three sections 610, 620, and 630. The section 610 shows switches for particular devices from various users of a system. Each user change is displayed with the switch date, a user identification, and the device where the job was redirected. Section 620 shows the last N (e.g., 3) print jobs that were recorded within the system.

Section 630 shows a summary of devices used as replacement. In this example, the use of each system device is measured against total system use to quantify device usage as a percentage of total use within the system. In this example, the device printer-3 is employed 76% of the time and printer-1 for 20% for a given time period. The device switches in section 610 show that although the printer-1 device was initially employed at a particular volume, printer-3 was utilized in place of printer-1 after 15:09:51. In this manner, the administrator 114 can view device use and volume alongside switching activity data. From this information, soft failures can be easily identified and addressed.

It is to be appreciated that the administrator 114 is aware of the data processing capabilities of each system device. However, the display 600 can present the functionalities (e.g., color printer, duplex, etc.) provided by each of the devices that could indicate a user change for such a reason. In this example, the users that are displayed as switcher users are users of the observed printer, that is to say they use most of the time the observed printer.

In contrast, the display 700 shows low volume device use and includes sections 710, 720, and 730. The section 710 shows switches for particular devices from various users of a system. Each user change is displayed with the switch date, a user identification, and the device where the job was redirected. Section 720 shows the last N print jobs that were recorded within the system. Section 630 shows a summary of devices used as replacement. Since there were only two switches within a given time period, and both were to the same device printer-1, a soft failure determination is not accurate. This is based on the use data that exists, wherein one device is employed and no redirection actions are recorded as printer-1 is employed exclusively. Thus, since information is presented in combination with a soft failure detection algorithm, the administrator 114 can then decide that such detection was a false alarm.

Figure 8:
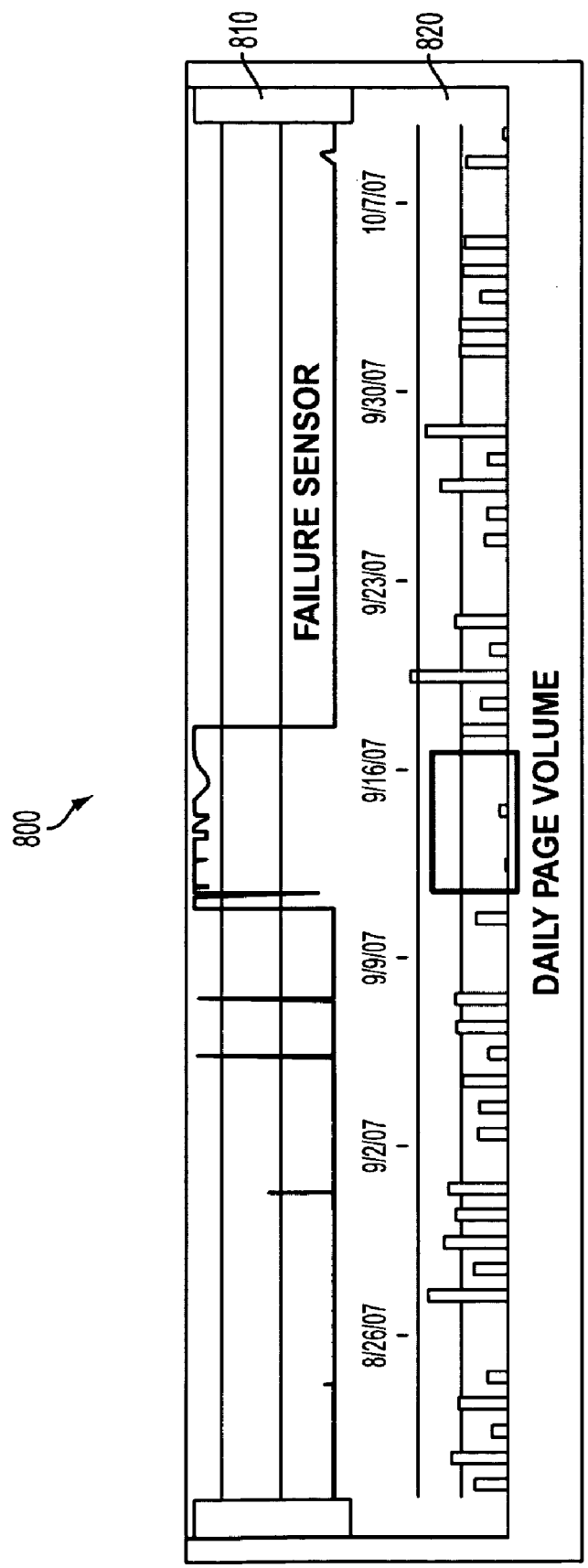
FIG. 8 illustrates an exemplary display of device volume use data alongside alarm data, in accordance with an aspect of the subject invention.

FIG. 8 illustrates another way to present system device use via a chart 800. This data is gathered via the interface 110 and stored in the log 120 for subsequent analysis. In order to present this data in a readily accessible manner, the administrative personnel of the system may want to visualize the logs or sequence of actions that are related to a specific device d in a given time range, say [t1, t2]. There are several cases where a visualization of the logs is needed. For example: 1) a user of the system informed the administrator about a problem and this latter just want to check if this impacts other users, 2) an automatic warning was raised by an imperfect failure detection system and the administrator wants a snapshot of the last recorded events related to the device to understand what happened to avoid unnecessary displacement (e.g., SNMP device alert table read based), etc.

The display 800 includes a failure sensor section 810 and a volume section 820 for a given device d in a system. Both the sections 810 and 820 are related to the same timeline so that results from both sections can be compared at like times. In addition, both sections employ bar graphs to present data in order to present data in an easily digestible format for the administrator 114 to review. The section 810 presents the results of the soft failure detection algorithm employed by the warning system 122. When a soft failure is detected by the warning system 122, the graph displays a value that is a percentage of the maximum failure sensor value. The variation in percentage is related to the algorithm's likelihood that a true soft failure exists and is not a false alarm. Thus, a value near one hundred percent is indicative that a confidence level is high that a soft failure exists. In contrast, a value around fifty percent or lower may indicate that a soft failure detection is false.

The section 820 provides the device use volume over a period of time. In this manner, the administrator 114 can asses a failure sensor soft failure detection in view of the volume of device use. Thus, moderate to high use followed by almost no use can verify that a device has indeed suffered a soft failure since low volume periods are likely to correspond with device unavailability periods. In this manner, the administrator 114 can accurately identify the soft device failure of this device. In addition, other metrics (e.g., number of alerts, number of daily users, etc.) can be used to enhance the inference and decision making process on whether there is an on-going failure.

Figure 9:
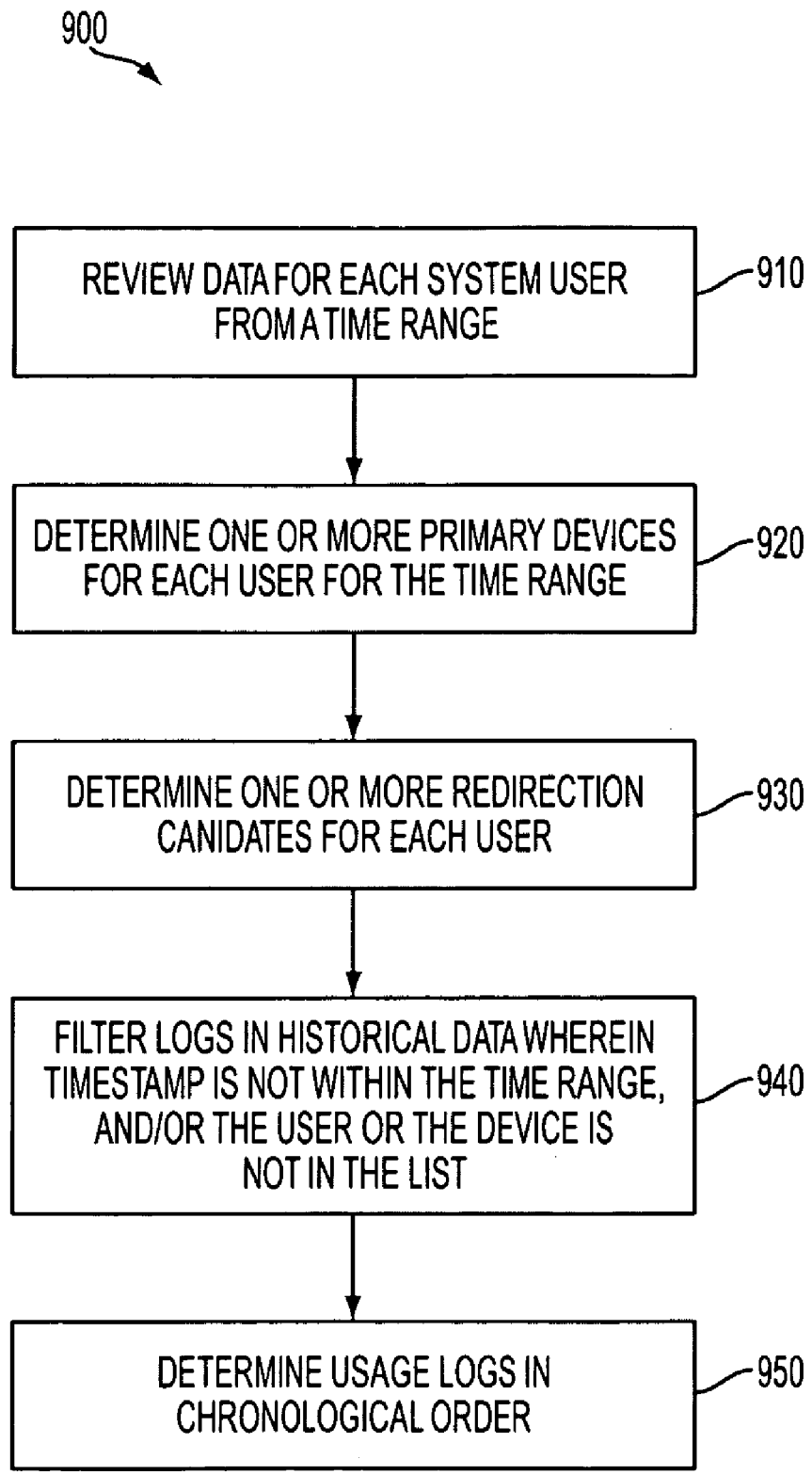
FIG. 9 illustrates a methodology to determine usage logs of devices in a chronological order, in accordance with an aspect of the subject invention.

FIG. 9 illustrates a methodology 900 to evaluate and determine device usage logs for a system in chronological order. At 910, data for each system user is reviewed for a given time range. Such data can include the devices interfaced by each user, the frequency of usage, the device type, etc. At 920, one or more primary devices for each user are determined. As noted, primary devices can be identified based on a predetermined minimum usage. There can be one primary device for each data processing type (color printer, b/w printer, fax machine, etc.) per user.

At 930, one or more redirection candidates are determined for each user. Such candidates can be selected based on data processing capability, proximity to a user, etc. Alternatively or in addition, a redirection candidate can be selected from a predefined cluster of users/devices within a system. At 940, logs in historical use data are filtered to exclude entries that are not within the time frame and/or a user or a device is not preselected for analysis. At 950, usage logs for the system are determined and presented in chronological order. In this manner, the logs can be efficiently reviewed by an administrator or other user for analysis.

Figure 10:
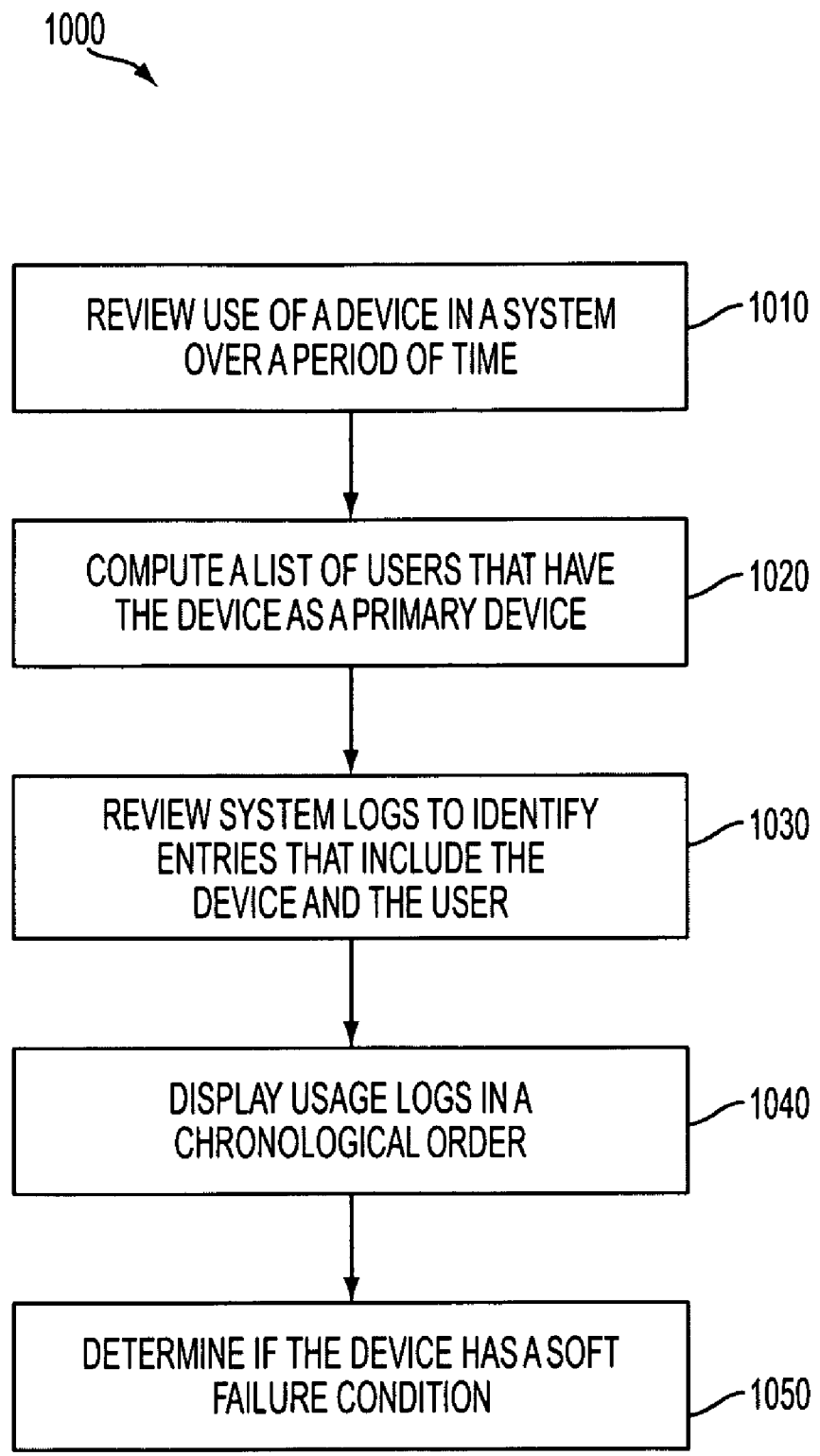
FIG. 10 illustrates a methodology to determine if the device has a soft failure condition, in accordance with an aspect of the subject invention.

FIG. 10 illustrates a methodology 1000 that determines if a device within a system has a soft failure condition. At reference numeral 1010, use of a device within a system is reviewed over a period of time. At 1020, a list of users that have the device as a primary device is computed. Establishing a primary device can be based on any number of predetermined metrics such as device use within a given time period, volume of use, etc. At 1030, system logs are reviewed to identify entries that include the device and the users. At 1040, usage logs are displayed in a chronological order and at 1050, a determination is made as to whether a soft failure condition exists. This determination can be based on failure detection from an algorithm viewed in context with device volume use, in accordance with the subject embodiments.

In summary, the systems and methods described herein enhance contextualization and visualization of soft failure algorithm output and employs a method that can be useful in several scenarios, such as a tool for the system administrator that wants to quickly understand how the users use a specific device. Soft failure contextual detection can also be employed in conjunction to a failure warning system: the alarm message is displayed with the subset of relevant jobs that enable the person which reads the warning message to quickly visualize where and when are located users interactions that are related to the detected failure. This helps to detect potential false alarms given by imperfect failure detection systems.

Contextual soft failure detection can also be employed to quickly build a database of failure dates. This database can be used to automatically tune a failure detection system and is useful to benchmark and compare multiple failure detection systems or algorithms. In addition, such systems can provide an historical view of the device availability and provide additional metrics like uptime or downtime.

The exemplary embodiments have been described with reference to the preferred embodiments. Obviously, modifications and alterations will occur to others upon reading and understanding the preceding detailed description. It is intended that the exemplary embodiments be construed as including all such modifications and alterations insofar as they come within the scope of the appended claims or the equivalents thereof.

The invention claimed is:

1. A system that identifies soft device failures within a system, comprising:
   an interface that captures transactional data between one or more users and one or more devices within the system and determines a primary device for each user based on an exclusive use of the primary device by the user for a time greater than a threshold, the interface computing a list of the one or more users sharing the primary device;
   a data log that receives the transactional data from the interface and stores the data as historical data for subsequent retrieval;
   a warning system that evaluates the historical data corresponding to the list and the primary device in the data log to identify a soft failure condition, wherein an alarm is output for each soft failure identified; and
   a display module that combines the historical data from the data log and one or more alarms from the warning system into a single display for review,
   wherein the display includes a plot of the primary device usage as a percentage of the system.

2. The system according to claim 1, further including:
   a filter that eliminates data that is not relevant to a soft failure condition.

3. The system according to claim 1, wherein data is reviewed by an administrator.

4. The system according to claim 1, wherein a device that has a high volume of use, with a period of low use during an alarm output indicates an accurate soft failure assessment by the warning system.

5. The system according to claim 1, wherein a device that has a low volume of use, with a period of low use does not indicate an accurate soft failure assessment by the warning system.

6. The system according to claim 1, further including:
   at least one display that receives soft device failure data from the display module.

7. The system according to claim 1, wherein data from the warning system and the log are presented via a bar graph that has a common time axis from the display module to the at least one display.

8. The method of claim 1, wherein the display module is triggered by at least one of a device failure, a threshold value of the number of switches away from a device within a given time period, and non-use of a device for longer than a predetermined time period.

9. A system that identifies soft device failure candidates, comprising:
   a plurality of devices in an infrastructure that are adapted to be used by one or more users, the devices further adapted to receive and process data;
   a log that stores the historical use of the plurality of devices by the one or more users;
   a primary device that is one of the plurality of devices;
   an interface that is adapted to determine if the primary device is employed by the one or more users for a time greater than a threshold when all of the plurality of devices are available, the interface defining the device as a primary device for the one or more users;
   a warning system that reviews the use of the one or more users, wherein an alarm is output when the primary device is not utilized according to a predetermined threshold;
   a display module that combines the historical data from the log and one or more alarms from the warning system into a single display; and,
   at least one display that receives soft device failure data from the display module.

10. The system according to claim 9, further including:
    one or more redirect candidates that have the same processing capability as the primary device and are located within a proximity to the one or more users of the primary device.

11. The system according to claim 10, wherein a device is filtered out if it is not a redirect candidate.

12. The system according to claim 10, wherein a redirect device is selected by the primary device users from one or more redirect candidates.

13. The system according to claim 9, wherein a switch by a user from a primary device to a redirect device is indicated via a graphical element.

14. The system according to claim 9, wherein the display presents the historical use and alarms for a device on a single graph.

15. The system according to claim 9, wherein the display module sends information to the at least one display when triggered by at least one of a device failure, a threshold value of the number of switches away from a device within a given time period, and non-use of a device for longer than a predetermined time period can trigger an output.

16. The method of claim 9, wherein the interface presents the plurality of devices on the display to the one or more users, wherein a graphical element connects each user to a respective primary device, a second graphical element further adapted to redirect candidates.

17. A method to identify soft device failures within a system, comprising:
    displaying by a display use of a device in the system over a period of time;
    capturing by an interface an exclusive use of the device by a user for a time greater than a threshold, the interface defining the device as primary device for the user;
    receiving historical data to identify entries that include the device and the user;
    displaying usage logs in a chronological order;
    determining by a processing component if the device has a soft failure condition; and
    displaying the volume of device use and alarm outputs for a time period on a single graph.

18. The method of claim 17, further including:
    executing an algorithm that outputs an alarm if a soft failure condition is identified, wherein the alarm is associated with a level of trustworthiness.

* * * * *